(12) United States Patent
Nakagawa et al.

(10) Patent No.: US 11,113,364 B2
(45) Date of Patent: Sep. 7, 2021

(54) TIME SERIES DATA ANALYSIS CONTROL METHOD AND ANALYSIS CONTROL DEVICE

(71) Applicant: Hitachi, Ltd., Tokyo (JP)

(72) Inventors: Hiromitsu Nakagawa, Tokyo (JP); Keiro Muro, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 145 days.

(21) Appl. No.: 16/610,130

(22) PCT Filed: May 8, 2017

(86) PCT No.: PCT/JP2017/017348
§ 371 (c)(1),
(2) Date: Nov. 1, 2019

(87) PCT Pub. No.: WO2018/207225
PCT Pub. Date: Nov. 15, 2018

(65) Prior Publication Data
US 2020/0089734 A1    Mar. 19, 2020

(51) Int. Cl.
*G06F 17/18*    (2006.01)
*G06Q 10/04*    (2012.01)
(Continued)

(52) U.S. Cl.
CPC ......... *G06F 17/18* (2013.01); *G05B 23/0224* (2013.01); *G05B 23/0281* (2013.01); *G06Q 10/04* (2013.01); *G06Q 10/0639* (2013.01)

(58) Field of Classification Search
CPC ................ G01D 21/02; G05B 23/0224; G05B 23/0281; G06F 17/18; G06Q 10/04; G06Q 10/0639
(Continued)

(56) References Cited

U.S. PATENT DOCUMENTS

| 9,378,183 B2 | 6/2016 | Tamaki |
| 9,674,058 B2 * | 6/2017 | Shimasaki ............ G06F 16/245 |
| 2018/0245987 A1 * | 8/2018 | Mizoguchi .............. G06F 17/15 |

FOREIGN PATENT DOCUMENTS

| JP | H07-319535 A | 12/1995 |
| JP | 2008-005118 A | 1/2008 |

(Continued)

OTHER PUBLICATIONS

International Search Report, dated Jul. 25, 2017, which issued during the prosecution of International Application No. PCT/JP2017/017348, which corresponds to the present application.

*Primary Examiner* — John H Le
(74) *Attorney, Agent, or Firm* — Baker Botts L.L.P.

(57) ABSTRACT

An analysis control device controls an analysis based on time series data for each of a plurality of sensors corresponding to a plurality of components that constitute a target device. The analysis control device acquires sensor data sets belonging to an analysis target time zone among the time series data of each of the plurality of sensors. Each sensor data set includes measurement values measured by a sensor. The analysis control device calculates an evaluation value according to a simple evaluation by using two or more sensor data sets corresponding to the sensor among the plurality of sensor data sets belonging to the analysis target time zone. The analysis control device sets an execution order of the analysis based on the measurement values of the sensor within a restricted time corresponding to the analysis target time zone in a descending order of the calculated evaluation value.

9 Claims, 18 Drawing Sheets

(51) Int. Cl.
*G05B 23/02* (2006.01)
*G06Q 10/06* (2012.01)

(58) Field of Classification Search
USPC .......................................................... 702/183
See application file for complete search history.

(56) References Cited

FOREIGN PATENT DOCUMENTS

| | | |
|---|---|---|
| JP | 2013-008111 A | 1/2013 |
| JP | 2015-194451 A | 11/2015 |
| WO | WO 2011/145496 A1 | 11/2011 |

\* cited by examiner

[FIG. 1]
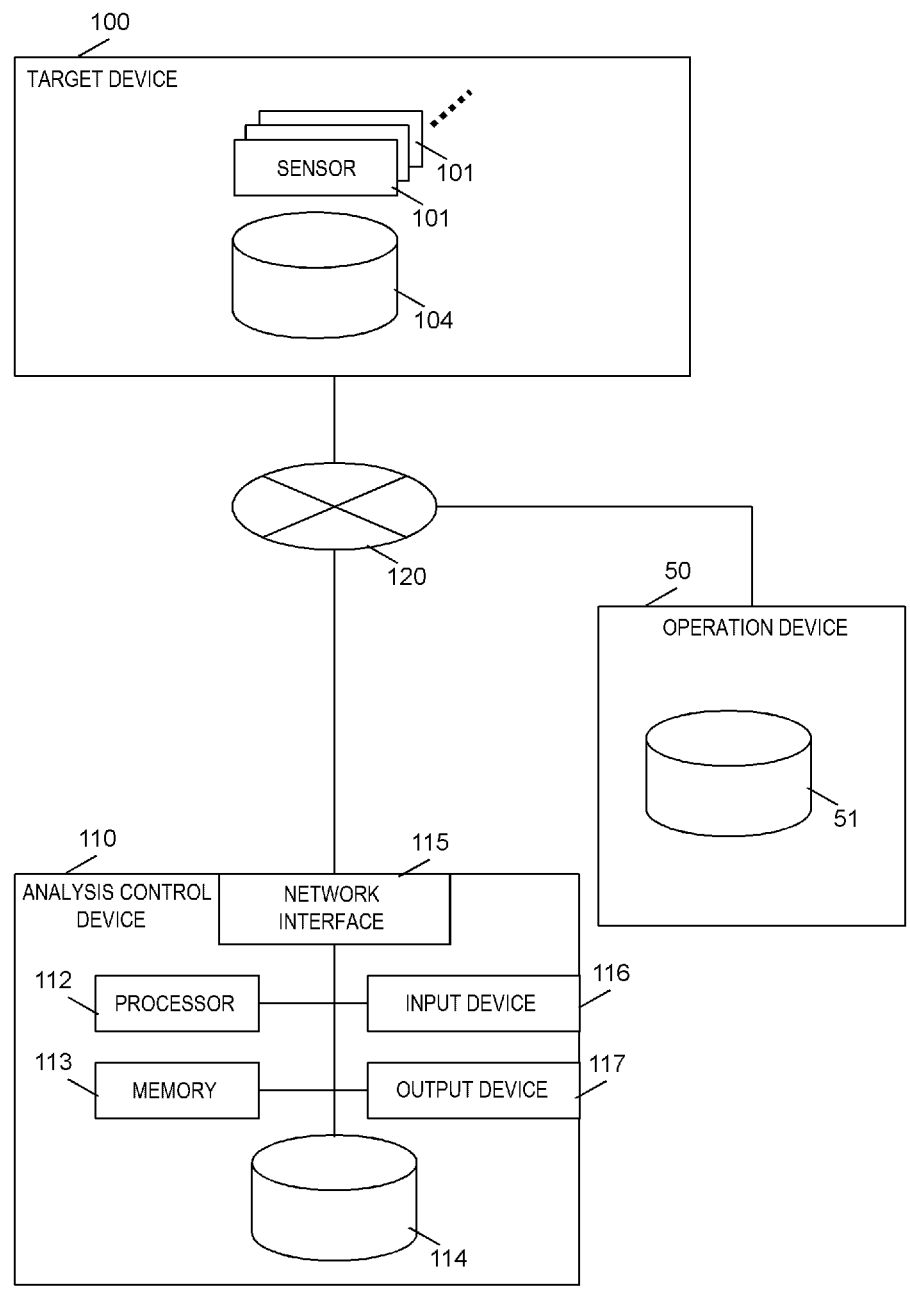

[FIG. 2]
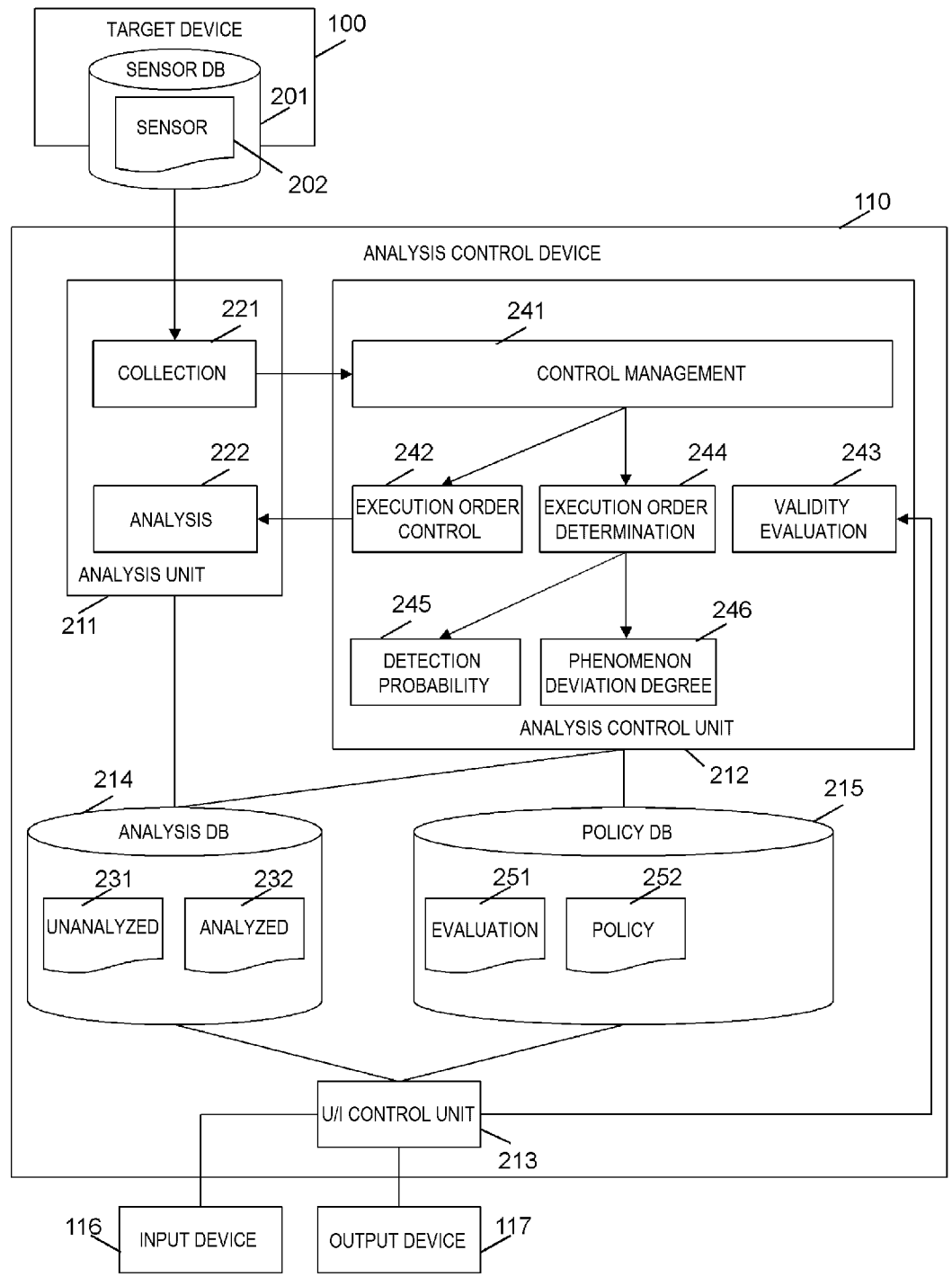

[FIG. 3]

SENSOR DB
201

SENSOR TABLE
202

| MEASUREMENT TIME POINT | SENSOR ID | MEASUREMENT VALUE |
|---|---|---|
| 12/24/2016 18:00:00 | S1 | 13.10 |
| 12/24/2016 18:00:00 | S2 | 8.91 |
| 12/24/2016 18:00:00 | S3 | 10.34 |
| 12/24/2016 18:00:00 | S4 | 12.49 |
| 12/24/2016 18:00:00 | S5 | 5.60 |
| 12/24/2016 18:00:01 | S1 | 13.76 |
| 12/24/2016 18:00:01 | S2 | 7.45 |
| 12/24/2016 18:00:01 | S3 | 10.81 |
| 12/24/2016 18:00:01 | S4 | 12.32 |
| 12/24/2016 18:00:01 | S5 | 5.03 |
| 12/24/2016 18:00:02 | S1 | 13.69 |
| 12/24/2016 18:00:02 | S2 | 7.94 |
| 12/24/2016 18:00:02 | S3 | 11.71 |
| 12/24/2016 18:00:02 | S4 | 11.91 |
| 12/24/2016 18:00:02 | S5 | 6.51 |
| 12/24/2016 18:00:03 | S1 | 13.01 |
| 12/24/2016 18:00:03 | S2 | 8.70 |
| 12/24/2016 18:00:03 | S3 | 11.70 |
| 12/24/2016 18:00:03 | S4 | 11.48 |
| 12/24/2016 18:00:03 | S5 | 6.75 |
| ... | ... | ... |

[FIG. 4]

ANALYSIS DB
214

UNANALYZED TABLE
231

| ANALYSIS ID (401) | TIME POINT (402) | SENSOR ID (403) | VALUE SET (404) |
|---|---|---|---|
| 2 | 12/24/2016 18:00:00 | S2 | 8.91, 7.45, 7.94, 8.70, 8.87, ... |
| 4 | 12/24/2016 18:00:00 | S4 | 12.49, 12.32, 11.91, 11.48, 12.66, ... |

ANALYZED TABLE
232

| ANALYSIS ID (431) | TIME POINT (432) | SENSOR ID (433) | ABNORMALITY DEGREE (434) |
|---|---|---|---|
| 1 | 12/24/2016 18:00:00 | S1 | 0.15 |
| 3 | 12/24/2016 18:00:00 | S3 | 0.20 |
| 5 | 12/24/2016 18:00:00 | S5 | 0.18 |

[FIG. 5]

POLICY DB
215

ANALYSIS EVALUATION TABLE
251

| ANALYSIS ID (501) | DETECTION PROBABILITY (502) | PHENOMENON DEVIATION DEGREE (503) | EVALUATION VALUE (504) | EXECUTION (505) |
|---|---|---|---|---|
| 1 | 0.50 | 0.81 | 1.31 | True |
| 2 | 0.45 | 0.54 | 0.99 | False |
| 3 | 0.72 | 0.70 | 1.42 | True |
| 4 | 0.38 | 0.57 | 0.95 | False |
| 5 | 0.20 | 0.90 | 1.10 | True |

EVALUATION POLICY TABLE
252

| POLICY ID (511) | EVALUATION POLICY (512) | EVALUATION ACCURACY (513) | SELECTION (514) |
|---|---|---|---|
| 01 | DETECTION PROBABILITY + PHENOMENON DEVIATION DEGREE | 0.83 | True |
| 02 | DETECTION PROBABILITY × PHENOMENON DEVIATION DEGREE | 0.75 | False |
| 03 | 2 DETECTION PROBABILITY × PHENOMENON DEVIATION DEGREE | 0.79 | False |
| 04 | DETECTION PROBABILITY + 3 PHENOMENON DEVIATION DEGREE | 0.32 | False |

[FIG. 6]
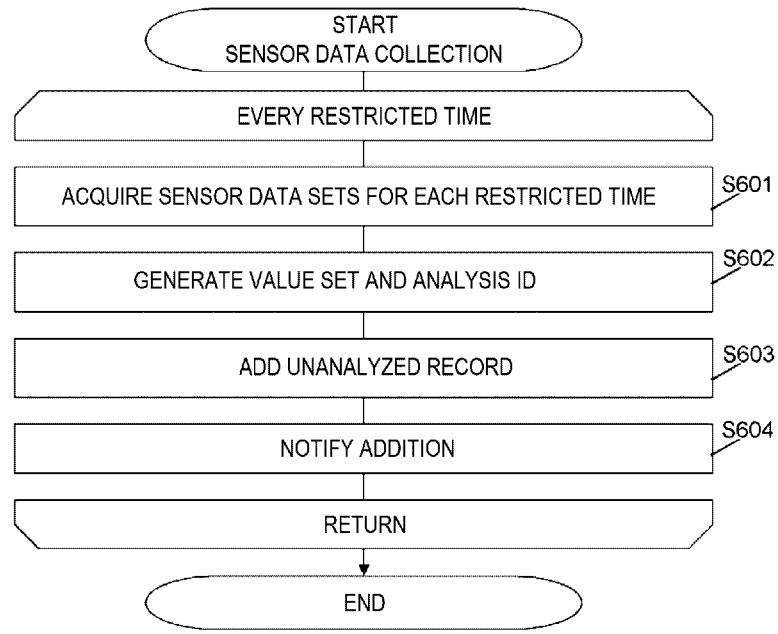
[FIG. 7]
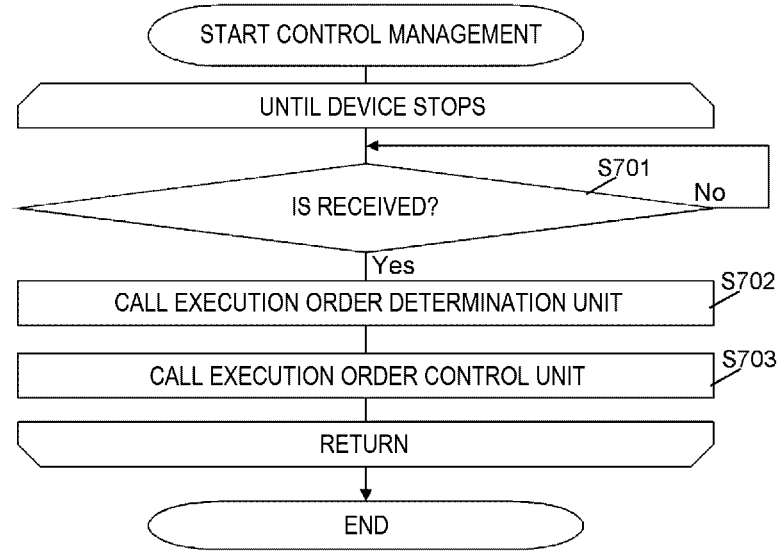

[FIG. 8]
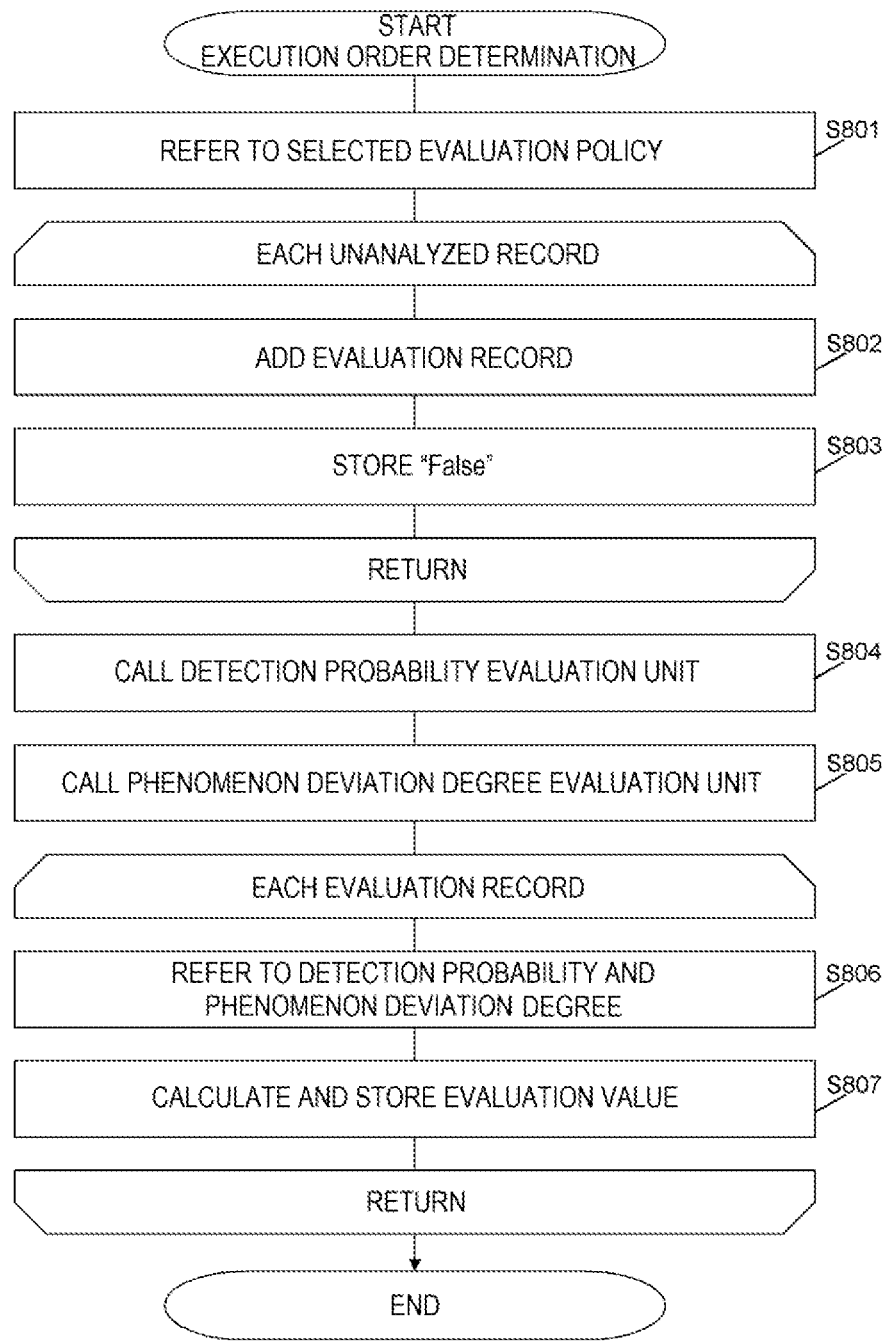

[FIG. 9]
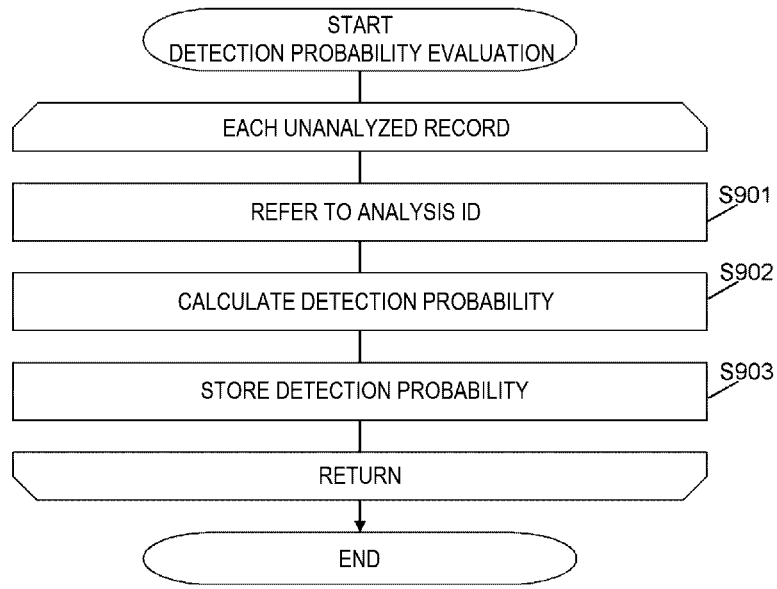
[FIG. 10]
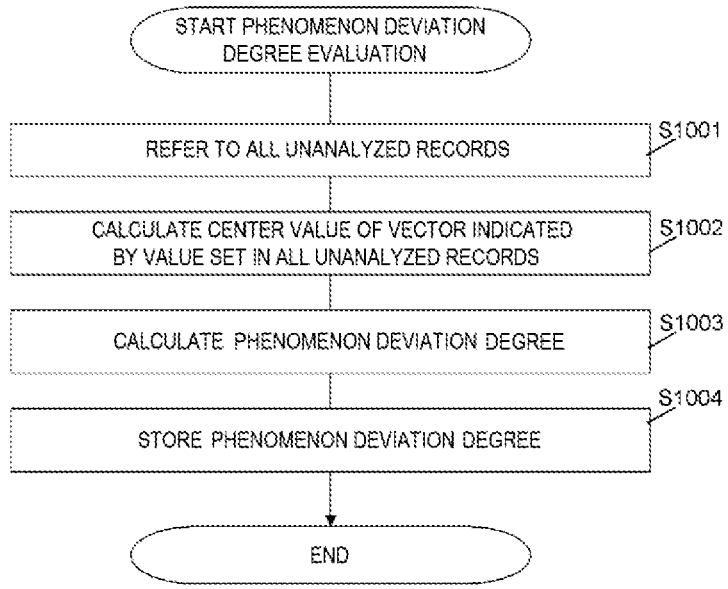

[FIG. 11]
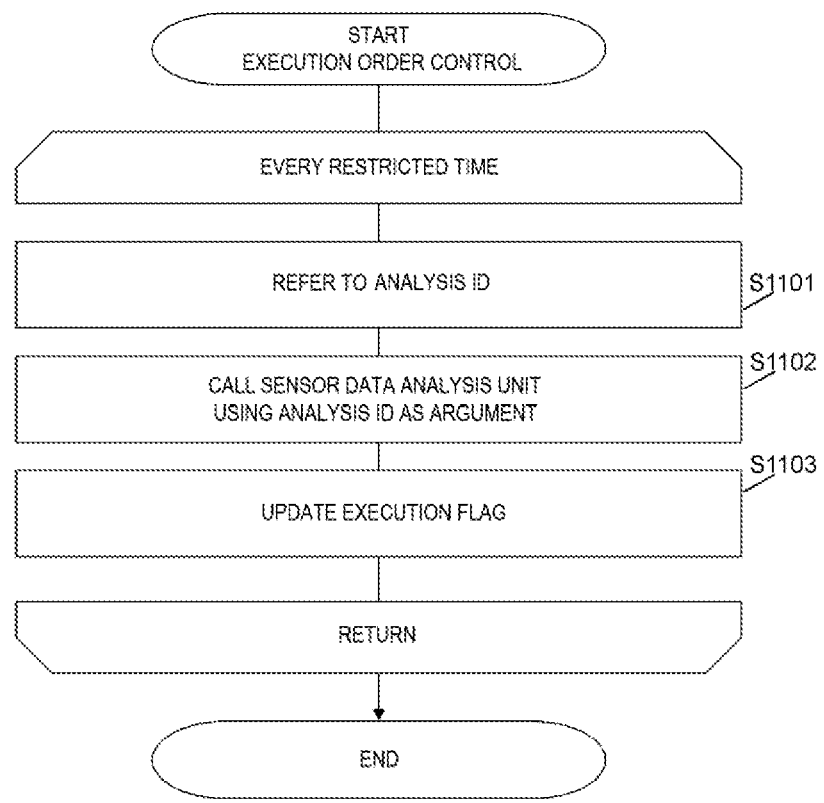

[FIG. 12]
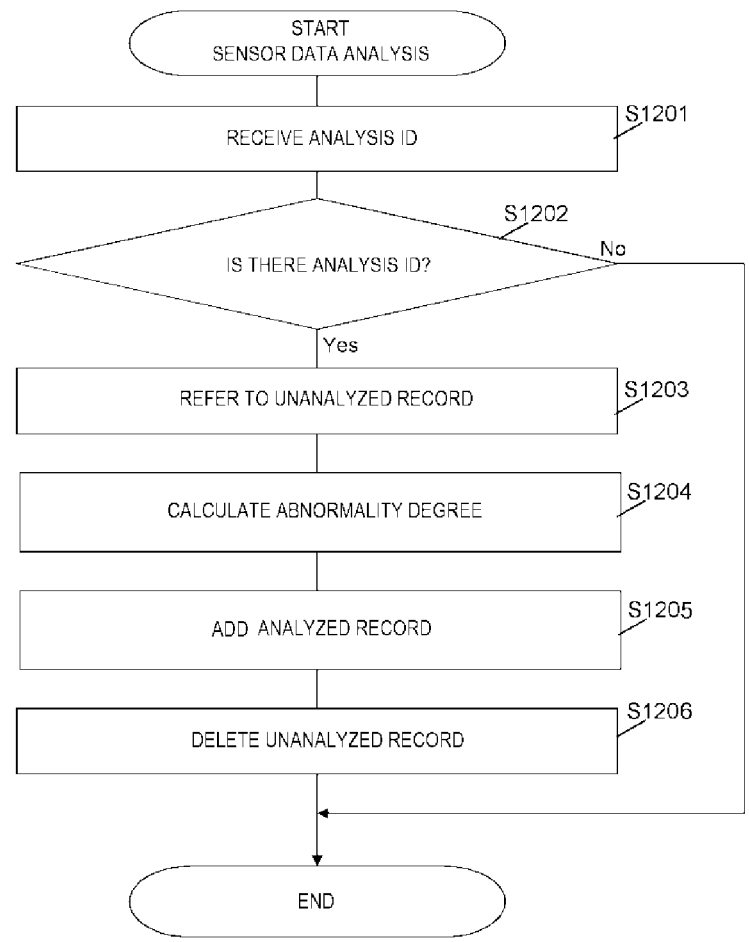

[FIG. 13]
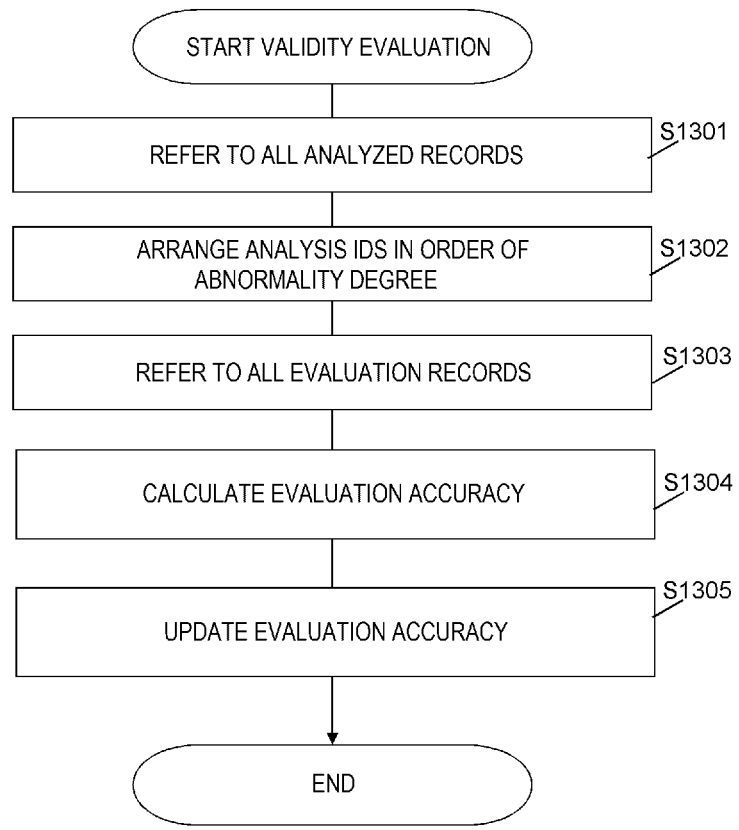

[FIG. 14]
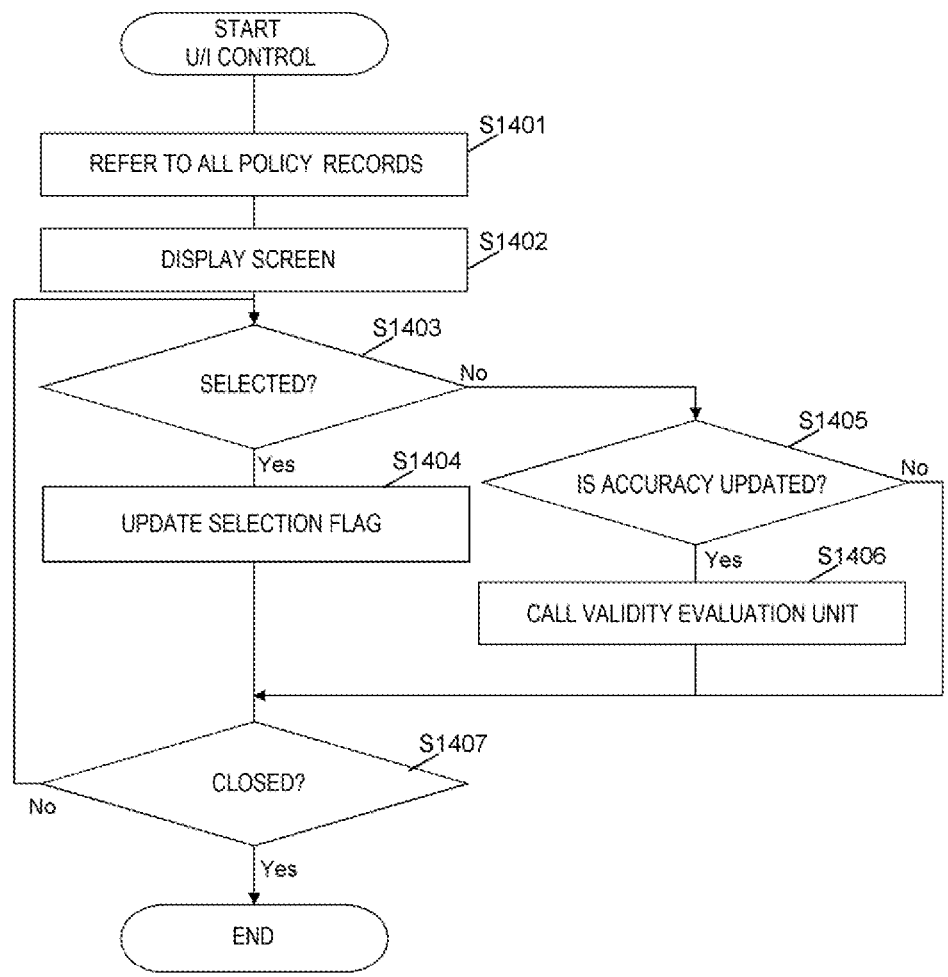

[FIG. 15]
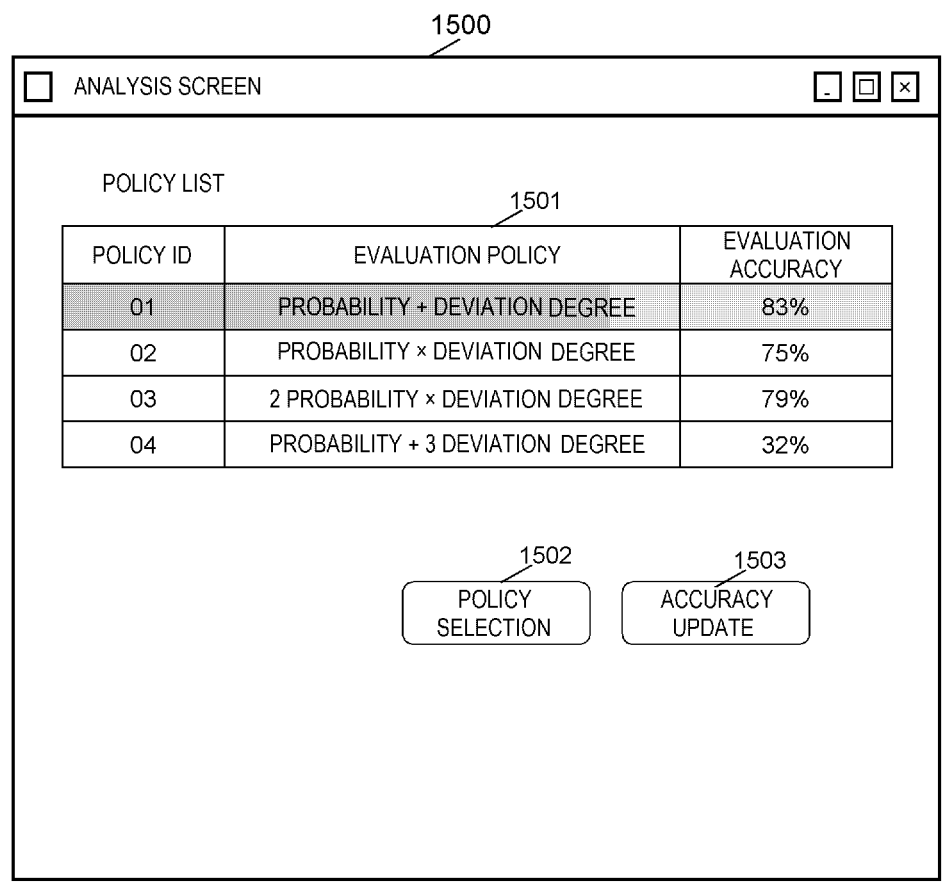

[FIG. 16]
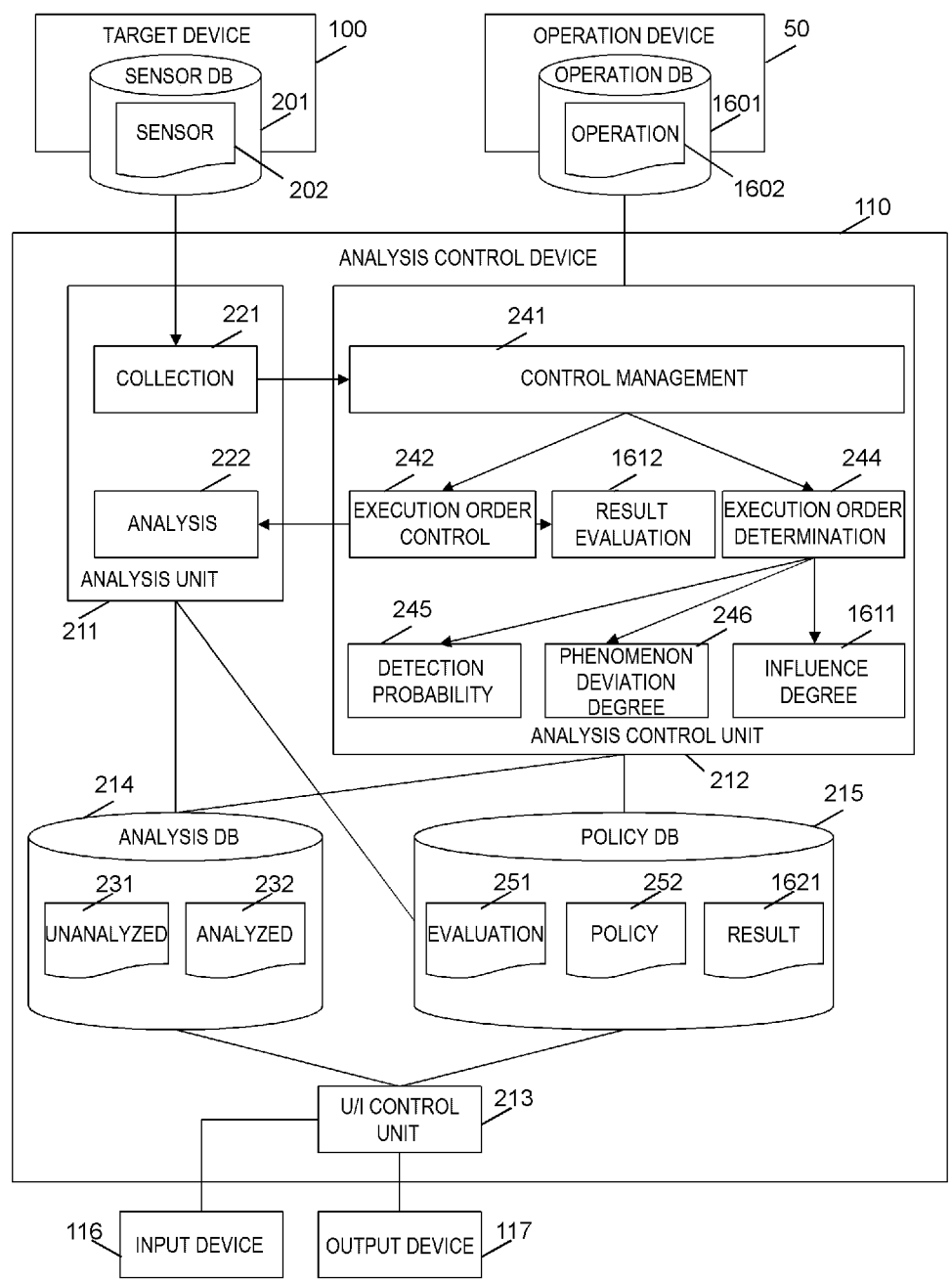

[FIG. 17]

OPERATION DB
1601

OPERATION TABLE
1602

| SENSOR ID | COMPONENT NAME | MAINTENANCE PRICE | MAINTENANCE RECORD |
|---|---|---|---|
| S1 | COMPONENT A | 120000 | 10/1/2016 12:00:00 |
| S2 | COMPONENT B | 990000 | 1/5/2015 12:00:00 |
| S3 | COMPONENT B | 990000 | 1/5/2015 12:00:00 |
| S4 | COMPONENT C | 570000 | - |
| S5 | COMPONENT D | 910000 | 1/5/2015 12:00:00 |

[FIG. 18]

POLICY DB
215

EVALUATION POLICY TABLE
252

ANALYSIS RESULT TABLE
1621

| RESULT ID | TIME POINT | SENSOR ID | CALCULATION TIME |
|---|---|---|---|
| 1 | 12/23/2016 18:00:00 | S1 | 120 |
| 3 | 12/23/2016 18:00:00 | S3 | 110 |
| 5 | 12/23/2016 18:00:00 | S5 | 115 |
| 7 | 12/23/2016 18:10:00 | S2 | 115 |
| ... | ... | ... | ... |

ANALYSIS EVALUATION TABLE
251

| ANALYSIS ID | DETECTION PROBABILITY | PHENOMENON DEVIATION DEGREE | OPERATION INFLUENCE DEGREE | EVALUATION VALUE | EXECUTION |
|---|---|---|---|---|---|
| 1 | 0.50 | 0.81 | 0.12 | 1.42 | False |
| 2 | 0.45 | 0.54 | 0.99 | 1.98 | True |
| 3 | 0.72 | 0.70 | 0.99 | 2.41 | True |
| 4 | 0.38 | 0.57 | 0.57 | 1.52 | False |
| 5 | 0.20 | 0.90 | 0.91 | 2.01 | True |

[FIG. 19]
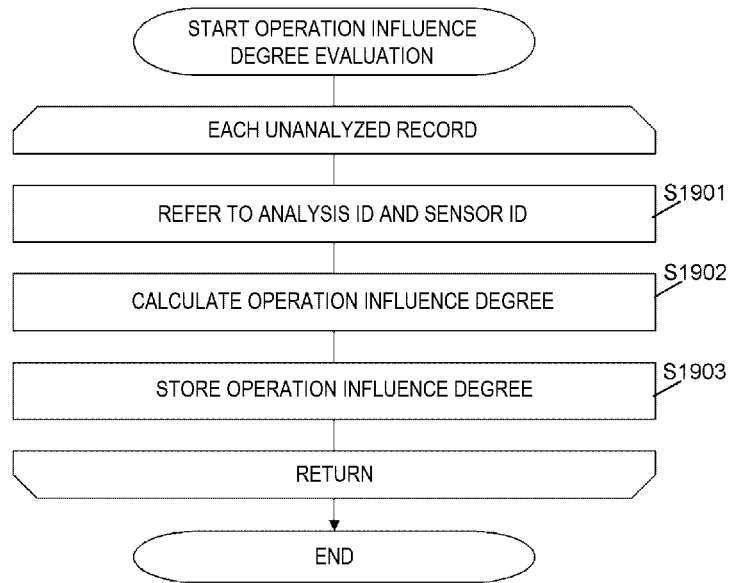
[FIG. 20]
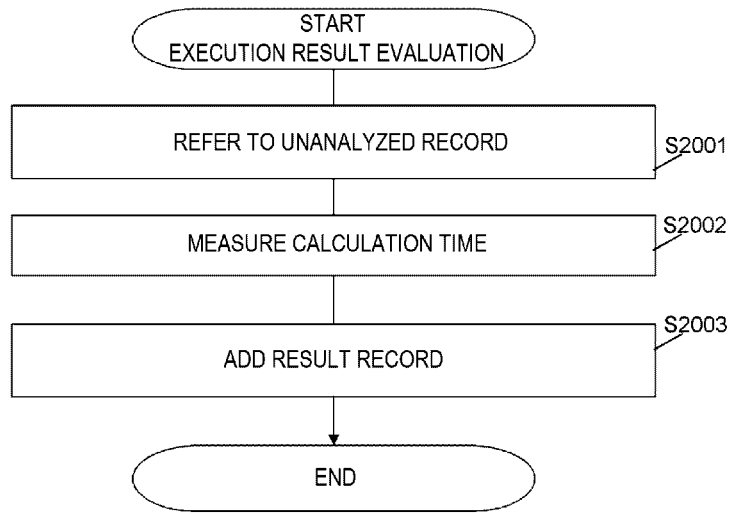

[FIG. 21]
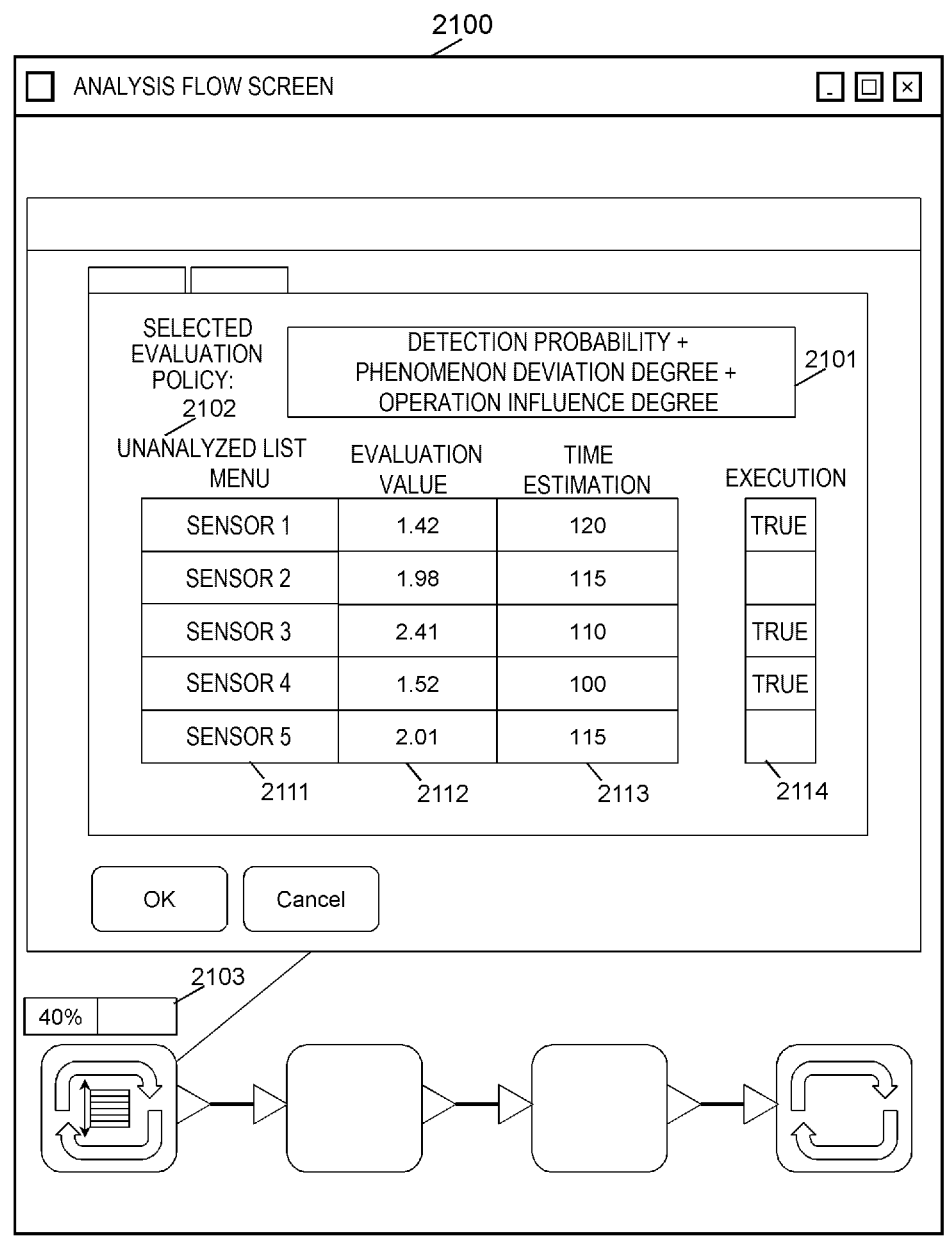

TIME SERIES DATA ANALYSIS CONTROL METHOD AND ANALYSIS CONTROL DEVICE

CROSS REFERENCE TO PRIOR APPLICATIONS

This application is a U.S. National Phase application under 35 U.S.C. § 371 of International Application No. PCT/JP2017/017348, filed on May 8, 2017. The International Application was published in Japanese on Nov. 15, 2018 as WO 2018/207225 A1 under PCT Article 21(2). The contents of the above applications are hereby incorporated by reference.

TECHNICAL FIELD

The present invention relates generally to data analysis.

BACKGROUND ART

In recent years, as symbolized by terms Internet of Things (IoT) and Cyber Physical Systems (CPS), various devices are connected to a network to perform data communication and control with each other. For example, in an electric power field, time series data of a power sensor attached to each home is used for scheduling of home electric appliances and prediction of power demand. Alternatively, in a transportation field, time series data of an acceleration sensor attached to each vehicle is used as a guideline for a road maintenance plan and an insurance premium.

In these time series data analyses, a plurality of analysts may often analyze the same analysis object and extract or aggregate knowledge from various viewpoints. For example, in an analysis of wind power generation facilities, a material and shape property data and operating state data are measured or estimated for each component such as a blade, a nacelle, and a tower, and a plurality of analysts perform a multifaceted analysis such as a damage analysis, a corrosion analysis, and device abnormality detection.

On the other hand, in order to reflect these analysis results in a maintenance operation, it is necessary to determine a measure within a restricted time such as a control interval and a maintenance period.

However, when the multifaceted analysis is performed by using time series data of a large number of sensors related to a large number of components, there is a problem that analysis is too time-consuming and a measure determination is not in time. Therefore, it is a problem in the field to exhibit an analysis result with an accuracy necessary for the measure determination within a restricted time.

According to PTL 1, a diagnostic object is divided in units of a plurality of failure portions. A diagnostic device performs a preliminary diagnosis for each unit of the diagnostic object. Accordingly, explosion of a combination of diagnostic items is prevented.

According to PTL 2, a diagnostic processing management device stores analysis processing with a priority in a queue according to an alarm, and a diagnostic execution device executes processing within a load reference. Accordingly, it is possible to avoid applying a load exceeding an allowable range.

PRIOR ART LITERATURE

Patent Literature

PTL 1: JP-A-2015-194451
PTL 2: JP-A-2008-005118

SUMMARY OF INVENTION

Technical Problem

If a technology according to PTL 1 is used, it is conceivable to classify a plurality of components corresponding to a plurality of sensors into two or more units of failure portions and design a preliminary diagnosis for each unit of failure portions. However, since the unit of failure portions and the preliminary diagnosis are designed in advance, there is a problem that it is difficult to maintain an accuracy of the multifaceted analysis (to maintain an accuracy of analysis even when the purpose of the analysis is changed).

In the technology according to PTL 2, if the load reference is low, only similar diagnoses are performed and a detection omission of a failure may increase.

Solution to Problem

An analysis control device controls an analysis based on time series data of each of a plurality of sensors corresponding to a plurality of components that constitute a target device. Specifically, the analysis control device acquires a sensor data set belonging to an analysis target time zone among the time series data of each of the plurality of sensors. Each sensor data set includes a measurement value that is a value measured by a sensor corresponding to the sensor data set. The analysis control device calculates, for each of the plurality of sensors, an evaluation value according to a simple evaluation by using two or more sensor data sets corresponding to the sensor among the plurality of sensor data sets belonging to the analysis target time zone. The analysis control device sets an execution order of the analysis based on the measurement value of the sensor within a restricted time corresponding to the analysis target time zone, in a descending order of the calculated evaluation value.

Advantageous Effect

According to the invention, it can be expected that analysis processing with few detection omissions is performed within a time limit.

BRIEF DESCRIPTION OF DRAWINGS

FIG. 1 shows an overall physical configuration of a system according to a first embodiment.
FIG. 2 shows an overall logical configuration of the system according to the first embodiment.
FIG. 3 shows a configuration of a table stored in a sensor DB.
FIG. 4 shows configurations of tables stored in an analysis DB.
FIG. 5 shows configurations of tables stored in a policy DB.
FIG. 6 shows a flow of sensor data collection processing.
FIG. 7 shows a flow of control management processing.
FIG. 8 shows a flow of execution order determination processing.

FIG. 9 shows a flow of detection probability evaluation processing.

FIG. 10 shows a flow of phenomenon deviation degree evaluation processing.

FIG. 11 shows a flow of execution order control processing.

FIG. 12 shows a flow of sensor data analysis processing.

FIG. 13 shows a flow of validity evaluation processing.

FIG. 14 shows a flow of U/I control processing.

FIG. 15 shows an example of a configuration of an analysis screen.

FIG. 16 shows an overall logical configuration of a system according to a second embodiment.

FIG. 17 shows a configuration of a table stored in an operation DB.

FIG. 18 shows a configuration of a table stored in a policy DB.

FIG. 19 shows a flow of operation influence degree evaluation processing.

FIG. 20 shows a flow of execution result evaluation processing.

FIG. 21 shows an example of a configuration of an analysis flow screen.

DESCRIPTION OF EMBODIMENTS

Hereinafter, embodiments of the invention will be described with reference to the drawings. However, it should be noted that these embodiments are only examples for carrying out the invention and the technical scope of the invention is not limited thereto.

In the following description, an "interface unit" includes one or more interface devices. One or more interfaces may be one or more interface devices of the same type (for example, one or more Network Interface Cards (NICs)), or may be two or more interface devices of different types (for example, a NIC and a Host Bus Adapter (HBA)).

In the following description, a "storage unit" includes one or more memories. At least one memory may be a volatile memory or a non-volatile memory. The storage unit may include one or more PDEVs in addition to one or more memories. The "PDEV" means a physical storage device, which is typically a non-volatile storage device (for example, an auxiliary storage device). The PDEV may be, for example, a Hard Disk Drive (HDD) or a Solid State Drive (SSD).

In the following description, a "processor unit" includes one or more processors. At least one processor is typically a Central Processing Unit (CPU). The processor may include a hardware circuit that performs a part or all of processing.

In the following description, an expression of a "kkk unit" (except the interface unit, the storage unit and the processor unit) may be used to describe a function. However, the function may be realized by the processor unit by executing one or more computer programs, or realized by one or more hardware circuits (for example, a Field-Programmable Gate Array (FPGA) or an Application Specific Integrated Circuit (ASIC)). When the function is realized by the processor unit by executing the programs, determined processing may be performed by using the storage unit and/or the interface unit or the like as appropriate, so that the function may at least partially belong to the processor unit. The processing described using the function as a subject may be performed by the processor unit or an apparatus including the processor unit. The programs may be installed from a program source. The program source may be, for example, a program distribution computer or a computer-readable recording medium (for example, a non-transitory recording medium). The description of each function is an example, and a plurality of functions may be combined into a one function, or one function may be divided into a plurality of functions.

In the following description, although information is described by an expression of an "xxx table", information may be expressed by any data structure. That is, the "xxx table" can be referred to as "xxx information" to indicate that the information does not depend on the data structure. In the following description, a configuration of each table is an example, one table may be divided into two or more tables, and all or a part of the two or more tables may be combined into one table.

Further, in the following description, although a "time point" is expressed by units of year, month, day, hour, minute and second, a time point unit may be coarser or finer than the above, or may be a different unit.

In the following description, a "data set" means data (a chunk of logical electronic data) including one or more data elements, and may be any of a record, a file, a key-value pair, and a tuple, for example.

Further, in the following description, for each component, a definition of "abnormality" may depend on a purpose of an analysis and may be, for example, a component failure, component corrosion, component damage, or an indication thereof.

First Embodiment

FIG. 1 shows an overall physical configuration of a system according to a first embodiment.

A target device 100 is a device to be managed. The target device 100 includes a plurality of components (not shown). For example, the target device 100 may be one or more wind turbines installed in a wind farm. A plurality of components of each wind turbine includes a blade, a nacelle, a tower, or the like. A plurality of sensors 101 are provided for the plurality of components. For example, one or more sensors 101 are provided in each component.

The target device 100 includes a storage device 104 in which time series data from each of the plurality of sensors 101 is stored. The storage device 104 includes one or more PDEVs. The PDEV is a physical non-volatile storage device, for example, a hard disk drive (HDD) or a solid state drive (SSD). At least a part of the storage device 104 may exist outside the target device 100.

An operation device 50 and an analysis control device 110 are connected to the target device 100 via a communication network (for example, a Wide Area Network (WAN)) 120.

The operation device 50 is a computer system (one or more computers) that manages information related to maintenance of components of the target device 100. The operation device 50 includes a storage device 51 that stores the information. The storage device 51 includes one or more PDEVs. At least a part of the storage device 51 may exist outside the operation device 50.

The analysis control device 110 may be a computer system (one or more computers), for example, a stand-alone computer usable by one or more users (analysts), or may be at least a server computer in a server computer and a client computer. Therefore, a "user interface device" may be one or more user interface devices of the computer (at least one of an input device and an output device), or may be a client computer including one or more user interface devices. In the following description, a "user operation" refers to an operation performed by a user using an input device. Further, according to the following description, the analysis control device 110 can display information, and "display information" may mean sending information to be displayed to the user interface device and displaying an display target (for example, an analysis result) represented by the information by the user interface device.

The analysis control device 110 includes a network interface 115, an input device 116, an output device 117, a storage device 114, a memory 113, and a processor 112 connected thereto.

The network interface 115 is an example of the interface unit, and is a communication interface device that communicates via the communication network 120.

The input device 116 and the output device 117 are examples of one or more user interface devices. The input device 116 is, for example, a keyboard and a pointing device. The output device 117 is, for example, a display device.

The storage device 114 and the memory 113 are examples of the storage unit. The storage device 114 includes one or more PDEVs. The memory 113 is, for example, a Dynamic Random Access Memory (DRAM), and stores one or more programs to be executed by the processor 112.

The processor 112 is an example of the processor unit, and executes one or more programs.

The overall configuration of the system according to the present embodiment has been described above. In the present embodiment, the target device 100, the operation device 50, and the analysis control device 110 are connected to the communication network 120, and the overall configuration of the system is not limited to the configuration shown in FIG. 1. For example, each of two or more of the devices 100, 50, and 110 may be a Virtual Machine (VM) to be executed in a computer system.

FIG. 2 shows an overall logical configuration of the system.

The target device 100 (storage device 104) stores a sensor DB 201. The sensor DB 201 stores a sensor table 202.

The analysis control device 110 (storage device 114) stores an analysis DB 214 and a policy DB 215. The analysis DB 214 stores an unanalyzed table 231 and an analyzed table 232. The policy DB 215 stores an analysis evaluation table 251 and an evaluation policy table 252.

The analysis control device 110 includes an analysis unit 211 and an analysis control unit 212. The analysis unit 211 and the analysis control unit 212 have functions realized by executing one or more programs executed by the processor 112.

The analysis unit 211 performs an analysis based on a plurality of sensor data sets. Specifically, for example, the analysis unit 211 includes a sensor data collection unit 221 that collects the sensor data set, and a sensor data analysis unit 222 that performs an analysis based on the collected sensor data set. The "sensor data set" is a data set including a value measured by a sensor.

The analysis control unit 212 controls the analysis performed by the analysis unit 211. Specifically, for example, the analysis control device 110 includes an execution order determination unit 244 that determines an execution order of the analysis, an execution order control unit 242 that controls a start of the analysis according to the execution order, a control management unit 241 that controls calling of the execution order determination unit 244 and the execution order control unit 242, a detection probability evaluation unit 245 that calculates a detection probability, which is a first viewpoint for determining the execution order, a phenomenon deviation degree evaluation unit 246 that calculates a phenomenon deviation degree, which is a second viewpoint for determining the execution order, a validity evaluation unit 243 that calculates validity (an evaluation accuracy) of the execution order, and an U/I control unit 213 that displays a screen as an U/I (user interface).

The sensor data collection, the analysis control, and the sensor data analysis may be performed synchronously or asynchronously. The sensor DB 201, the analysis DB 214, and the policy DB 215 may be the same DB or record.

FIG. 3 shows a configuration of a table stored in the sensor DB 201.

The sensor DB 201 stores the sensor table 202. The sensor table 202 stores sensor data sets from each sensor. Specifically, for example, the sensor table 202 includes a record (hereinafter, referred to as a sensor record) for each measurement. Each sensor record stores information such as a sensor data set, specifically a measurement time point 301, a sensor ID 302, and a measurement value 303.

The measurement time point 301 indicates a time point when a value is measured. The sensor ID 302 indicates an identifier of the sensor 101. The measurement value 303 indicates a value measured by the sensor.

In the present embodiment, the analysis control device 110 performs an analysis in addition to the analysis control. As a modification, the analysis unit 211 may be implemented by an external device (not shown) that can communicate with the analysis control device 110.

Hereinafter, a sensor record (sensor data set) whose measurement time 301 belongs to a target time zone is referred to as "a sensor record (sensor data set) belonging to the target time zone".

FIG. 4 shows configurations of the tables stored in the analysis DB 214.

The analysis DB 214 stores the unanalyzed table 231 and the analyzed table 232.

The unanalyzed table 231 stores information related to an aggregation result of a plurality of sensor records (a plurality of sensor data sets) belonging to the target time zone (hereinafter referred to as a target time zone). Specifically, for example, the unanalyzed table 231 includes a record (hereinafter, an unanalyzed record) for each sensor 101. Each unanalyzed record stores information such as an analysis ID 401, a time point 402, a sensor ID 403, and a value set 404.

The analysis ID 401 indicates an identifier of a group of a set of the sensor 101 and the measurement value 303. The time point 402 indicates a start time point of the target time zone. The sensor ID 403 indicates an identifier of the sensor 101. The value set 404 indicates a set of two or more measurement values 303 respectively contained in two or more sensor records for a corresponding sensor 101 among the plurality of sensor records belonging to the target time zone.

A record (hereinafter, an analyzed record) in the analyzed table 232 stores information related to an analysis result using the unanalyzed record corresponding to the record. Each analyzed record stores information such as an analysis ID 411, a time point 412, a sensor ID 413, and an abnormality degree 414.

The analysis ID 411, the time point 412, and the sensor ID 413 indicate the analysis ID 401, the time point 402, and the sensor ID 403 in the corresponding unanalyzed record. The abnormality degree 414 is a value calculated in an analysis using the value set 404 of the corresponding unanalyzed record, and is a value indicating a degree of abnormality of a component corresponding to the sensor 101 identified from the sensor ID 413. The smaller the abnormality degree is, the lower the degree of abnormality is (that is, the component is close to normal), and the larger the abnormality degree is, the larger the degree of abnormality is (that is, the component is close to abnormal).

In the present embodiment, when an analyzed record is generated based on an unanalyzed record, the unanalyzed record is deleted. However, the unanalyzed record may not necessarily be deleted. For example, the unanalyzed table 231 and the analyzed table 232 may be integrated, and an abnormality degree may be added to the record as an analysis result.

FIG. 5 shows configurations of the tables stored in the policy DB 215.

The policy DB 215 stores the analysis evaluation table 251 and the evaluation policy table 252.

The analysis evaluation table 251 stores information related to an evaluation priority for each unanalyzed record. Specifically, for example, the analysis evaluation table 251 includes a record (hereinafter, an evaluation record) for each unanalyzed record. Each evaluation record stores information such as an analysis ID 501, a detection probability 502, a phenomenon deviation degree 503, an evaluation value 504, and an execution flag 505.

The analysis ID 501 indicates the analysis ID 401 in a corresponding unanalyzed record.

The detection probability 502 corresponds to a probability that an abnormality occurs in a component corresponding to the corresponding sensor 101 (the sensor 101 corresponding to the sensor ID 403 in the corresponding unanalyzed record). Specifically, for example, the detection probability 502 is based on a difference between a maximum value and a minimum value in the value set 404 in the corresponding unanalyzed record.

The phenomenon deviation degree 503 corresponds to a difference between a state of a component corresponding to the corresponding sensor 101 and a state of all components corresponding to all sensors 101. Specifically, for example, the phenomenon deviation degree 503 indicates a difference between a value that is based on the value set 404 in the corresponding unanalyzed record (for example, a center value of a vector indicated by the value set 404) and a value that is based on the value set 404 in all unanalyzed records (for example, a center value of a vector indicated by all value set 404).

The evaluation value 504 is a value calculated according to a selected evaluation policy by using the corresponding detection probability 502 and the corresponding phenomenon deviation degree 503.

The execution flag 505 indicates whether the analysis is performed ("True") or not ("False").

The evaluation policy table 252 stores information related to an evaluation policy. The evaluation policy table 252 includes a record (hereinafter, a policy record) for each evaluation policy. Each policy record stores information such as a policy ID 511, an evaluation policy 512, an evaluation accuracy 513, and a selection flag 514.

The policy ID 511 indicates an identifier of the evaluation policy. The evaluation policy 512 indicates a method of calculating the evaluation value 504 by using the detection probability 502 and the phenomenon deviation degree 503. The evaluation accuracy 513 indicates an accuracy of the evaluation policy. The selection flag 514 indicates whether the evaluation policy is selected ("True") or not ("False").

In the present embodiment, for each unanalyzed record, the evaluation value 504 is calculated according to a selected evaluation policy among a plurality of evaluation policies. However, for each unanalyzed record, a plurality of evaluation values 504 may be calculated respectively according to the plurality of evaluation policies.

Hereinafter, an example of processing performed in the present embodiment will be described.

FIG. 6 shows a flow of collection processing of data of the sensor 101.

In a restricted time interval, S601 to S604 are performed. That is, the sensor data collection unit 221 acquires sensor records (sensor data sets) belong to each target time zone from the sensor table 202 (S601). The sensor data collection unit 221 classifies the measurement values 303 of the sensor records acquired in S601 into the value set 404 for each sensor 101, and associates the analysis ID 401 with each value set 404 (S602). The sensor data collection unit 221 stores, for each sensor 101, an unanalyzed record including the value set 404 and the analysis ID 401 that are generated in S602 in the unanalyzed table 231 (S603). The sensor data collection unit 221 notifies the control management unit 241 of an addition of the unanalyzed record (S604).

It should be noted that the sensor records for each target time zone are not always acquired. That is, there may be a delay or a loss of the sensor record. Therefore, catching up or skipping an acquisition of the sensor data set may be performed based on a difference between a current time point and a storage result (measurement time point 301).

FIG. 7 shows a flow of control management processing.

The control management unit 241 performs S701 to S703 until the analysis control device 110 stops.

That is, the control management unit 241 determines whether a notification of the additional of the unanalyzed record is received (S701). If the determination result in S701 is true (S701: Yes), the control management unit 241 calls the execution order determination unit 244 (S702) and calls the execution order control unit 242 (S703).

S702 and S703 may be performed periodically instead of or in addition to starting from the notification of the addition of the unanalyzed record.

FIG. 8 shows a flow of execution order determination processing. The processing is performed when the execution order determination unit 244 is called.

The execution order determination unit 244 refers to the evaluation policy 512 in the policy record including "True" in the selection flag 514 (S801).

S802 and S803 are performed for each unanalyzed record. That is, the execution order determination unit 244 stores the analysis ID 501 same as the analysis ID 401 in the unanalyzed record in the evaluation record corresponding to the unanalyzed record (S802). The execution order determination unit 244 stores "False" in the execution flag 505 in the evaluation record corresponding to the unanalyzed record (S803).

The execution order determination unit 244 calls the detection probability evaluation unit 245 to obtain the detection probability 502 for each unanalyzed record (S804). The execution order determination unit 244 calls the phenomenon deviation degree evaluation unit 246 to obtain the phenomenon deviation degree 503 for each unanalyzed record (S805).

S806 and S807 are performed for each unanalyzed record. That is, the execution order determination unit 244 refers to the detection probability 502 and the phenomenon deviation degree 503 in the evaluation record corresponding to the unanalyzed record (S806). The execution order determination unit 244 calculates the evaluation value 504 according to the selected evaluation policy 512 by using the detection probability 502 and the phenomenon deviation degree 503 referenced in S806, and stores the calculated evaluation value 504 in the evaluation record corresponding to the unanalyzed record (S807).

In the present embodiment, at least a policy record including "True" in the selection flag 514 is prepared. Although the phenomenon deviation degree 503 is calculated based on a value that is based on the value set 404 in one unanalyzed record and a value that is based on the value set 404 in all unanalyzed records for the same target time zone, the value that is based on the value set 404 in all unanalyzed records may be a value considering values for past target time zones in addition to the target time zone.

FIG. 9 shows a flow of detection probability evaluation processing. The processing is performed when the detection probability evaluation unit 245 is called.

S901 to S903 are performed for each unanalyzed record. That is, the detection probability evaluation unit 245 acquires the analysis ID 401 from the unanalyzed record (S901). The detection probability evaluation unit 245 calculates the detection probability 502 according to a difference between a maximum value and a minimum value in the value set 404 in the unanalyzed record (S902). The detection probability 502 calculated in S902 is stored in an evaluation record having the analysis ID 501 matching the analysis ID 401 acquired in S901 (S903).

The detection probability 502 may be calculated by performing another method, for example, rounding up a convergence calculation or approximating a waveform according to logic of the sensor data analysis unit 222.

FIG. 10 shows a flow of phenomenon deviation degree evaluation processing. The processing is performed when the phenomenon deviation degree evaluation unit 246 is called.

The phenomenon deviation degree evaluation unit 246 acquires all unanalyzed records (S1001). The phenomenon deviation degree evaluation unit 246 calculates a center value of vectors each being indicated by the value set 404 in all unanalyzed records (S1002). The phenomenon deviation degree evaluation unit 246 calculates, for each unanalyzed record, the phenomenon deviation degree 503 according to a difference between a center value of a vector indicated by the value set 404 in the unanalyzed record and the center value calculated in S1002 (S1003). The phenomenon deviation degree evaluation unit 246 stores, for each unanalyzed record, the phenomenon deviation degree 503 calculated in S1003 in an evaluation record having the analysis ID 501 matching the analysis ID 401 in the unanalyzed record (S1004).

The phenomenon deviation degree 503 may be, for example, a deviation degree between a part of unanalyzed records in the present and past unanalyzed records and a pre-defined model, for each unanalyzed record, which is calculated by another method.

FIG. 11 shows a flow of execution order control processing. The processing is performed when the execution order control unit 242 is called.

In a restricted time interval, S1101 to S1103 are performed. That is, the execution order control unit 242 acquires the analysis ID 501 in an evaluation record having "False" in the execution flag 505 in a descending order of the evaluation value (S1101). The execution order control unit 242 obtains an analyzed record by calling the sensor data analysis unit 222 using the analysis ID 501 as an argument in an order of acquiring the analysis ID 501 (in a descending order of the evaluation value 504) (S1102). The execution order control unit 242 updates the execution flag 505 in the evaluation record corresponding to the unanalyzed record from which the analyzed record is obtained from "False" to "True" (S1103).

In S1101, the analysis ID 501 in an evaluation record corresponding to the unanalyzed record remaining without being deleted may be acquired. A restricted time may be a fixed value or a variable value (for example, an arbitrary value set by a user).

Further, according to FIG. 11, the analysis of the unanalyzed records belonging to the target time zone is executed in the descending order of the evaluation value 504 at a restricted time interval. In other words, the analysis using the unanalyzed record is performed in the descending order of the evaluation value 504 until the restricted time corresponding to the target time zoon ends. Therefore, when the analyses of all unanalyzed records belonging to the target time zone are not ended within the restricted time corresponding to the target time zone, the analysis for the target time zone is ended. Even when the analysis is not performed for all unanalyzed records, possibility of an abnormality detection omission is low since the unanalyzed record is analyzed in a descending order of the evaluation value. A start time point of the "restricted time" may be a time of acquiring the sensor records belonging to the analysis target time zone (that is, a start time of the sensor data collection processing in FIG. 6), and may be a start time of the execution order control processing in FIG. 11.

FIG. 12 shows a flow of sensor data analysis processing. The processing is performed when the sensor data analysis unit 222 is called.

The sensor data analysis unit 222 receives the analysis ID 501 from the execution order control unit 242 (S1201). The sensor data analysis unit 222 determines whether there is an unanalyzed record having the analysis ID 401 matching the received analysis ID 501 (S1202).

If the determination result in S1202 is true (S1202) (S1202: Yes), the sensor data analysis unit 222 acquires an unanalyzed record having the analysis ID 401 matching the received analysis ID 501 (S1203). The sensor data analysis unit 222 calculates the abnormality degree 414 based on the value set 404 in the unanalyzed record acquired in S1203 (S1204). The sensor data analysis unit 222 stores an analyzed record including the analysis ID 411, the time point 412, the sensor ID 413 matching the analysis ID 401, the time point 402 and the sensor ID 403 in the unanalyzed record acquired in S1203, and the abnormality degree 414 calculated in S1204 in the analyzed table 232 (S1205). The sensor data analysis unit 222 deletes the unanalyzed record acquired in S1203 from the unanalyzed table 231 (S1206).

FIG. 13 shows a flow of validity evaluation processing. The processing is performed when the validity evaluation unit 243 is called.

The validity evaluation unit 243 acquires all analyzed records (S1301). The validity evaluation unit 243 arranges the analysis IDs 411 in a descending order of the abnormality degree (S1302). If analyses of all unanalyzed records are not completed within a restricted time, there may be no analyzed record for an unanalyzed record corresponding to an analysis ID with a low evaluation value 504.

The validity evaluation unit 243 acquires all evaluation records (S1303). The validity evaluation unit 243 calculates the evaluation accuracy 513 for each analysis ID 501 (S1304). Specifically, the validity evaluation unit 243 arranges the analysis IDs 501 in the descending order of the evaluation value 504. The validity evaluation unit 243 compares an analysis ID arrangement in the descending order of the evaluation value 504 (rank order of each analysis ID 501) and an analysis ID arrangement in a descending order of the abnormality degree 414 (rank order of each analysis ID 411). The validity evaluation unit 243 calculates, for each analysis ID 501, the evaluation accuracy 513 as a value according to a difference between the rank order of the analysis ID 501 and the rank order of the analysis ID 411 matching the analysis ID 501.

The validity evaluation unit 243 stores the evaluation accuracy 513 calculated in S1304 in a policy record having "True" in the selection policy (S1305).

The evaluation accuracy 513 may be calculated by another method, for example, assigning a relatively high weight to the relatively high abnormality degree 414. In this case, if a difference between a rank order of the analysis ID 411 corresponding to the abnormality degree 414 to which the relatively high weight is assigned and a rank order of the analysis ID 501 corresponding to the evaluation value 504 is small, a higher evaluation accuracy 513 is calculated. If the difference between the rank order of the analysis ID 411 corresponding to the abnormality degree 414 to which the relatively high weight is assigned and the rank order of the analysis ID 501 corresponding to the evaluation value 504 is large, a lower evaluation accuracy 513 is calculated.

FIG. 14 shows a flow of U/I control processing. The processing is performed when the U/I control unit 213 is called.

The U/I control unit 213 acquires all evaluation records (S1401). The U/I control unit 213 displays an analysis screen, which is a screen on which an evaluation policy list is displayed, based on all the evaluation records acquired in S1401 (S1402). FIG. 15 shows an example of the analysis screen. The evaluation policy list 1501 includes an analysis ID, an evaluation policy, and an evaluation accuracy which are displayed based on the evaluation policy table 252 for each evaluation policy. An analysis screen 1500 includes a policy selection button 1502 and an accuracy update button 1503.

When a user operation for pressing the policy selection button 1502 is performed after a user operation for making a user-desired evaluation policy in the evaluation policy list 1501 in a selected state is performed (S1403: Yes), the U/I control unit 213 updates the selection flag 514 corresponding to the selected evaluation policy from "True" to "False", the selection flag 514 corresponding to the evaluation policy in the selected state is updated from "False" to "True" (S1404).

When the user operation for pressing the accuracy update button 1503 is performed (S1403: No and S1405: Yes), the U/I control unit 213 calls the validity evaluation unit 243.

A selection of the evaluation policy and a start of the validity evaluation processing (calling of the validity evaluation unit 243) may be performed automatically instead of being performed in response to the user operation. For example, an evaluation policy with the highest evaluation accuracy 513 may be automatically selected. Further, for example, the validity evaluation processing may be started periodically or at a predetermined event timing (for example, when all unanalyzed records are deleted).

Further, an addition or a deletion of the evaluation policy may be performed via an U/I such as an analysis screen.

The first embodiment has been described above.

According to the present embodiment, it can be expected that analysis processing with few detection omissions is performed within a time limit. Specifically, when there is a component in which an abnormality is occurred in a target time zone, an occurrence of the abnormality can be expected to be detected based on a plurality of sensor records (sensor data sets) belonging to the target time zone within a restricted time (for example, within a restricted time from a time of acquiring the plurality of sensor records).

More specifically, according to the present embodiment, the analysis control unit 212 calculates, for each unanalyzed record (each analysis ID 401) belonging to the target time zoon, the evaluation value 504 according to a simple evaluation based on the value set 404 in the unanalyzed record. The simple evaluation may be, for example, at least one of thinning out a value from the value set 404, rounding up a convergence calculation, and approximating with representative values. Specifically, the simple evaluation is at least one of the detection probability 502 and the phenomenon deviation degree 503. The analysis control unit 212 calculates the evaluation value 504 according to the selected evaluation policy by using both (or one of) the detection probability 502 and the phenomenon deviation degree 503.

The detection probability 502 means possibility of occurrence of an abnormality. The detection probability 502 depends on the value set 404 in the corresponding unanalyzed record (for example, the difference between the maximum value and the minimum value in the value sets 404).

On the other hand, the phenomenon deviation degree 503 means a difference degree of a phenomenon (state). The phenomenon deviation degree 503 is based on a relative relationship between at least one value set 404 among the value sets 404 in all unanalyzed records and the value set 404 in the corresponding unanalyzed record.

If at least one of the detection probability 502 and the phenomenon deviation degree 503 is high, the evaluation value 504 is high. Therefore, if the evaluation value 504 is high, it is considered that possibility of occurrence of an abnormality is high, or there is high possibility that another abnormality occurs in a component (for example, a component of a different type or a separate component) different from a component in which an abnormality is occurred. Therefore, the higher the evaluation value 504 is, the higher the possibility of obtaining the high abnormality degree 414 as an analysis result using the unanalyzed record corresponding to the evaluation value 504. Weighting from these viewpoints is expressed by an evaluation policy.

In the present embodiment, an execution order (analysis order) of the unanalyzed records is optimized based on such an evaluation value 504. Specifically, the analysis is performed in the descending order of the evaluation value 504.

That is, in the present embodiment, a plurality of unanalyzed records are classified according to the probability of abnormality occurrence in terms of the detection probability 502 and the phenomenon deviation degree 503, and the analysis is performed preferentially from the unanalyzed records considered to have higher probability of abnormality occurrence. Therefore, the analysis processing with few detection omissions can be performed within a time limit.

As a more specific example, for example, the following example is considered. If the target device 100 is a wind turbine, control for changing an orientation of the wind turbine is performed every 10 minutes, for example. The analysis unit 211 collects the sensor records for last 10 minutes in current 10 minutes, performs an analysis, and determines control content based on the result. The "10 minutes" is a time determined based on, for example, a wind power generation guideline, and is an example of the restricted time in the present embodiment. Analysis processing with few detection omissions can be expected every 10 minutes. For example, if an abnormality occurs in a tower in last 10 minutes, it is expected to detect the abnormality from the viewpoint of the detection probability 502 in the current 10 minutes. Further, if an abnormality is occurred in a blade in addition to the tower in the last 10 minutes, abnormalities of both the tower and the blade are detected from the viewpoint of the phenomenon deviation degree 503, in other words, it can be expected to avoid an occurrence of an abnormality detection omission of the blade caused by that only unanalyzed data related to the abnormality of the tower is analyzed even though the abnormality of the tower is detected, and the analysis of unanalyzed records related to the blade away from the tower is not in time.

In the present embodiment, the evaluation accuracy 513 of the evaluation policy used to calculate the evaluation value 504 is updated based on the analysis result. Specifically, the analysis control unit 212 updates the evaluation accuracy 513 of the selected evaluation policy according to a matching rate between an analysis ID arrangement in the descending order of the evaluation value 504 and an analysis ID 401 arrangement in the descending order of the abnormality degree 414. Accordingly, it can be expected that use of an evaluation policy having high evaluation accuracy 513 is maintained. An update of the evaluation accuracy 513 may be a manual update by a user instead of or in addition to an automatic update by the analysis control unit 212.

Second Embodiment

A second embodiment will be described. In this case, a difference between the first embodiment and the second embodiment will be mainly described, and the description of points common to the first embodiment will be omitted or simplified.

In the second embodiment, in selecting an unanalyzed record to be preferentially analyzed, in addition to the detection probability 502 and the phenomenon deviation degree 503, an operation influence degree and a time estimation are further considered.

The "operation influence degree" is a value that is based on a maintenance cost which is a cost related to maintenance. The maintenance cost is based on, for example, at least one of a component inventory amount, a distance between a location of the target device 100 and a location where the component is stored as inventory, a price of the component, and a maintenance schedule.

The "time estimation" is an estimation (predicted value) of a time taken for analyses of the unanalyzed records.

FIG. 16 shows an overall logical configuration of a system according to the second embodiment.

The operation device 50 (the storage device 51) stores an operation DB 1601. The operation DB stores an operation table 1602.

The policy DB 215 further stores an analysis result table 1621. The analysis unit 211 accesses the analysis result table 1621.

The analysis control unit 212 further includes an operation influence degree evaluation unit 1611 that calculates an operation influence degree. The analysis control unit 212 includes an execution result evaluation unit 1612 that calculates a calculation time instead of (or in addition to) the validity evaluation unit 243.

FIG. 17 shows a configuration of a table stored in the operation DB 1601.

The operation DB 1601 stores an operation table 1602. The operation table 1602 stores information related to maintenance (operation). The operation table 1602 includes a record (hereinafter, referred to as an operation record) for each sensor 101. Each operation record stores information such as a sensor ID 1701, a component name 1702, a maintenance price 1703, and a maintenance record 1704.

The sensor ID 1701 indicates an identifier of the sensor 101. The component name 1702 indicates a name of a component. The maintenance price 1703 indicates a price for maintenance. The maintenance record 1704 indicates a maintenance time point at which maintenance is performed. The maintenance record 1704 may include other types of information related to maintenance instead of or in addition to the maintenance time point. The evaluation accuracy 513 may be updated based on the maintenance record 1704.

FIG. 18 shows a configuration of a table stored in the policy DB 215.

The policy DB 215 stores the analysis evaluation table 251, the evaluation policy table 252, and the analysis result table 1621.

A configuration of the evaluation policy table 252 is similar with that of the first embodiment, so the illustration thereof is omitted. However, in the second embodiment, the operation influence degree affects the evaluation value in addition to the detection probability 502 and the phenomenon deviation degree 503. Therefore, the operation influence degree is contained in at least one evaluation policy 512.

Each evaluation record in the analysis evaluation table 251 further stores an operation influence degree 1811. The operation influence degree 1811 indicates a value calculated based on the maintenance price 1703.

The analysis result table 1621 stores information indicating the analysis result. The analysis result table 1621 includes a record (hereinafter, result record) for each analysis. Each result record stores information such as a result ID 1801, a time point 1802, a sensor ID 1803, and a calculation time 1804. The result ID indicates an identifier of a result (analysis). The time point 1802 and the sensor ID 1803 indicate the time point 1802 and the sensor ID 1803 in an analyzed unanalyzed record. The calculation time 1804 indicates a time taken for the analysis using the unanalyzed record.

FIG. 19 shows a flow of operation influence degree evaluation processing. The processing is performed when the operation influence degree evaluation unit 1611 is called. The operation influence degree evaluation unit 1611 is called by the execution order determination unit 244 for each unanalyzed record, for example, in the execution order determination processing (FIG. 8).

S1901 to S1903 are performed for each unanalyzed record. That is, the operation influence degree evaluation unit 1611 acquires the sensor ID 403 and the analysis ID 401 from the unanalyzed record (S1901). The operation influence degree evaluation unit 1611 acquires the maintenance price 1703 from an operation record having the sensor ID 1701 matching the sensor ID 403 acquired in S1901, and calculates the operation influence degree 1811 based on the acquired maintenance price 1703 (S1902). The operation influence degree evaluation unit 1611 stores the calculated operation influence degree 1811 in an evaluation record having the analysis ID 501 matching the analysis ID 401 acquired in S1901 (S1903).

Depending on the selected evaluation policy, the evaluation value 504 depends on the operation influence degree 1811. It is conceivable that the maintenance price 1703 is updated according to a situation. An actual maintenance price is considered in calculation of the evaluation value 504. Therefore, it is expected that an effect of determining (optimizing) the execution order of the unanalyzed records increases.

FIG. 20 shows a flow of execution result evaluation processing. The processing is performed when the execution result evaluation unit 1612 is called. The execution result evaluation unit 1612 is called by the execution order control unit 242 using the analysis ID 501 as an argument, for example, in the execution order control processing (FIG. 11).

The execution result evaluation unit 1612 acquires an unanalyzed record having the analysis ID 401 matching the analysis ID 501 as an argument (S2001). The execution result evaluation unit 1612 measures the calculation time 1804, which is a time required by the sensor data analysis unit 222 in the analysis using the unanalyzed record (S2002). The execution result evaluation unit 1612 stores the record ID 1801, the time point 1802 and the sensor ID 1803 matching the time point 402 and the sensor ID 403 in the unanalyzed record, and the calculation time 1804 measured in S2002, in a result record (S2003).

FIG. 21 shows an analysis flow screen.

The U/I control unit 213 displays an analysis flow screen 2100 instead of or in addition to the analysis screen 1500 displayed in FIG. 15. An analysis flow design using visual programming can be made, and the analysis flow screen 2100 displays a progress status of the analysis processing according to the analysis flow.

The U/I control unit 213 displays a selected evaluation policy column 2101, an unanalyzed list 2102, and an analysis progress 2103 on the analysis flow screen 2100.

The selected evaluation policy column 2101 displays the evaluation policy 512 in a policy record including "True" in the selection flag 514.

The unanalyzed list 2102 displays information such as a menu 2111, an evaluation value 2112, a time estimation 2113, and an execution flag 2114 for each unanalyzed record.

The menu 2111 indicates the sensor ID 403 in the unanalyzed record. The evaluation value 2112 indicates the evaluation value 504 in the evaluation record corresponding to the unanalyzed record. The time estimation 2113 indicates a time calculated by the U/I control unit 213 based on the unanalyzed record and one or more calculation times 1804 in one or more result records corresponding to the menu 2111 (sensor ID 403). The execution flag 2114 indicates the execution flag 505 in the evaluation record corresponding to the unanalyzed record.

The analysis progress 2103 indicates a numerical value according to the number of analyzed records with respect to the number of evaluation records. When the analysis progress 2103 is seen, a user can determine whether to end the analysis processing halfway and transition to the measure. For example, when receiving an instruction to end the analysis via the user interface device, the U/I control unit 213 may end the analysis by the analysis unit 211.

The second embodiment has been described above.

According to the present embodiment, the evaluation value 504 is calculated in consideration of the operation influence degree 1811 calculated based on the maintenance cost. Therefore, it can be expected to optimize the analysis execution order such that no analysis is performed for one that cannot be maintained, or the analysis is performed first for one that is costly when an abnormality is detected, that is, to overall optimize the analysis and the maintenance.

As mentioned above, although certain embodiments of the invention have been described, these embodiments are examples for illustrating the invention, and the scope of the invention is not intended to be limited to the above embodiments. The invention can be implemented in various other forms.

For example, the target device 100 is not limited to one or more wind turbines, and may be another device (structure) having a plurality of components, for example, an outdoor social infrastructure device that requires measurement, such as a construction machine, a railway, and an elevator.

An analytical flow design utilizing visual programming may also be applicable to the first embodiment.

Further, the time estimation 2113 may be calculated only for a sensor having a relatively high evaluation value 2112 (for example, only for a sensor whose evaluation value 2112 belongs to an upper X % (0<X≤100) among all sensors). In this case, the number of sensors for which the time estimation 2113 is calculated may be two or more.

REFERENCE SIGN LIST

110: analysis control device

The invention claimed is:

1. An analysis control device that controls an analysis based on time series data of each of a plurality of sensors corresponding to a plurality of components that constitute a target device, the analysis control device comprising:
a storage unit including one or more memories; and
a processor unit including one or more processors connected to the storage unit, wherein
the processor unit is configured to:
(A) acquire a sensor data set belonging to an analysis target time zone among the time series data of each of the plurality of sensors,
each sensor data set including a measurement value that is a value measured by a sensor corresponding to the sensor data set,
(B) calculate, for each of the plurality of sensors, an evaluation value according to a simple evaluation by using two or more sensor data sets corresponding to the sensor among the plurality of sensor data sets belonging to the analysis target time zone, and
(C) set an execution order of the analysis based on the measurement value of the sensor within a restricted time corresponding to the analysis target time zone in a descending order of the evaluation value calculated in (B).

2. The analysis control device according to claim 1, wherein
in (B), for each of the plurality of sensors, the simple evaluation is to perform at least one of the following (b1) and (b2),
(b1) calculating a detection probability, which is a value meaning possibility of occurrence of an abnormality in a component corresponding to the sensor based on two or more measurement values of two or more sensor data sets corresponding to the sensor among the plurality of sensor data sets belonging to the analysis target time zone,
(b2) calculating a phenomenon deviation degree which is a value based on a relative relationship between a plurality of measurement values of the plurality of sensor data sets belonging to the analysis target time zone and two or more measurement values of two or more sensor data sets corresponding to the sensor, and
in (B), the processor unit is configured to calculate, for each of the plurality of sensors, the evaluation value according to a predetermined evaluation policy by using at least one of the detection probability calculated in (b1) and the phenomenon deviation degree calculated in (b2).

3. The analysis control device according to claim 2, wherein
in (B), for each of the plurality of sensors, the simple evaluation includes both (b1) and (b2), and
in (B), the processor unit is configured to calculate, for each of the plurality of sensors, the evaluation value by using both the detection probability calculated in (b1) and the phenomenon deviation degree calculated in (b2).

4. The analysis control device according to claim 2, wherein
in (B), for each of the plurality of sensors, the simple evaluation is to further perform the following (b3),
(b3) calculating an operation influence degree, which is a value based on a cost related to maintenance of the component corresponding to the sensor, and
in (B), the processor unit is configured to calculates, for each of the plurality of sensors, the evaluation value by using the business influence degree calculated in (b3) and at least one of the detection probability calculated in (b1) and the phenomenon deviation degree calculated in (b2).

5. The analysis control device according to claim 1, wherein
in (B), for each of the plurality of sensors, the evaluation value is a value calculated according to a predetermined evaluation policy in addition to the simple evaluation.

6. The analysis control device according to claim 5, wherein
the predetermined evaluation policy is an evaluation policy having a highest evaluation accuracy among a plurality of evaluation policies, and
the processor unit is configured to:
(D) update the evaluation accuracy of the predetermined evaluation policy based on a matching degree between a sensor arrangement in a descending order of an abnormality degree and a sensor arrangement in a descending order of the evaluation value calculated in (B),
one or more abnormality degrees respectively corresponding to one or more sensors being one or more values calculated respectively for the one or more sensors based on the two or more measurement values corresponding to the one or more sensors by the analysis within the restricted time corresponding to the analysis target time zone.

7. The analysis control device according to claim 6, wherein
the processor unit is configured to display the plurality of evaluation policies and a plurality of evaluation accuracies respectively corresponding to the plurality of evaluation policies, and
the processor unit is configured to receive selection of the plurality of evaluation policies.

8. The analysis control device according to claim 1, wherein
the processor unit is configured to calculate, for each of two or more sensors, a time estimation required for analysis based on two or more sensor data sets belonging to the analysis target time zone, and
the processor unit is configured to display the evaluation value and the time estimation for each of the two or more sensors, and an analysis progress.

9. An analysis control method that controls an analysis based on time series data of each of a plurality of sensors corresponding to a plurality of components that constitute a target device, the analysis control method comprising:
(A) acquiring a sensor data set belonging to an analysis target time zone among the time series data of each of the plurality of sensors;
each sensor data set including a measurement value that is a value measured by a sensor corresponding to the sensor data set,
(B) calculating, for each of the plurality of sensors, an evaluation value according to a simple evaluation by using two or more sensor data sets corresponding to the sensor among the plurality of sensor data sets belonging to the analysis target time zone; and
(C) setting an execution order of the analysis based on the measurement value of the sensor within a restricted time corresponding to the analysis target time zone in a descending order of the evaluation value calculated in (B).

* * * * *